April 26, 1938. C. E. HEDRICK 2,115,263
POULTRY FEEDER
Filed April 16, 1937
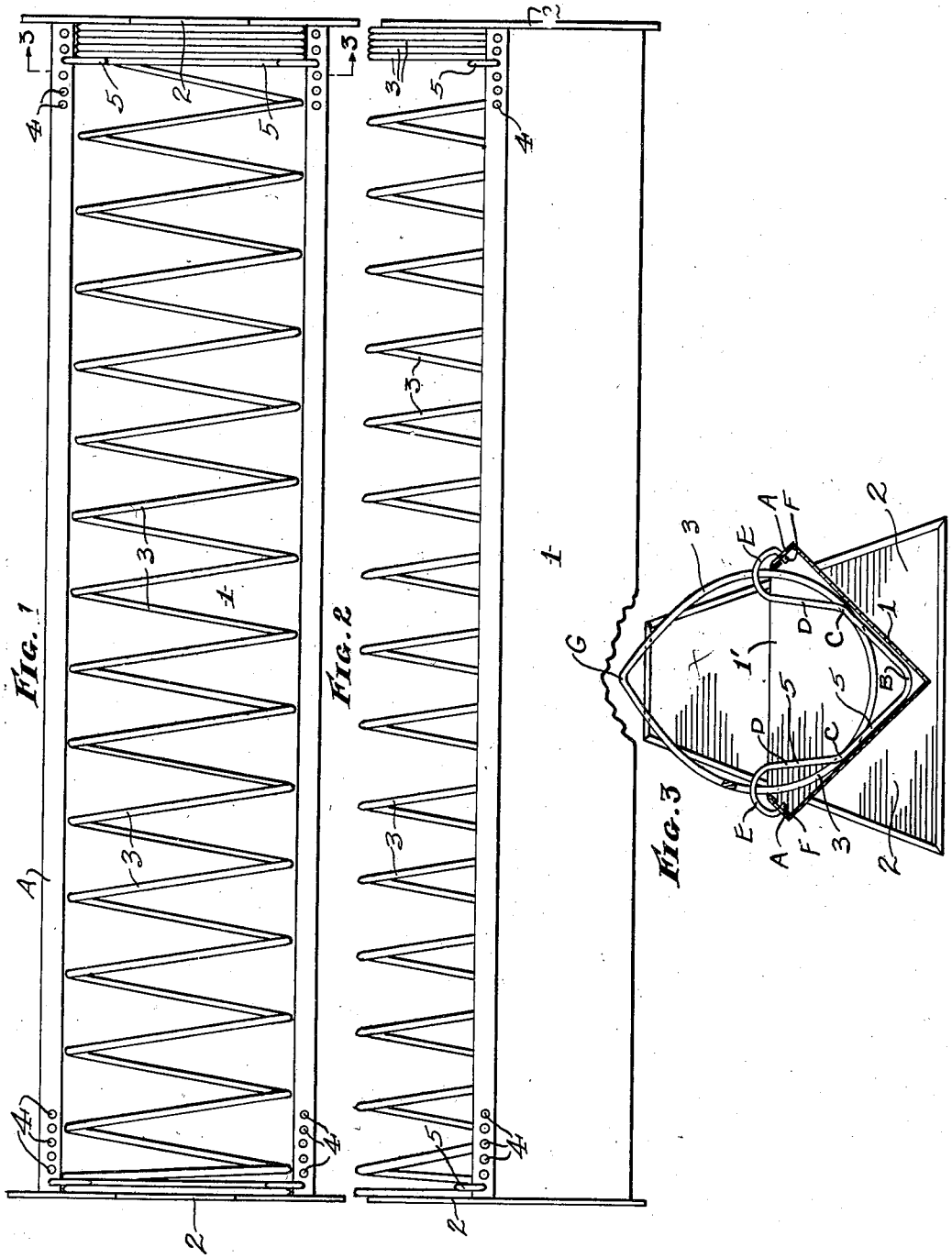
INVENTOR.
CLARENCE E. HEDRICK
BY
U. S. Charles
ATTORNEY.

Patented Apr. 26, 1938

2,115,263

UNITED STATES PATENT OFFICE 2,115,263

POULTRY FEEDER

Clarence Elliott Hedrick, Newton, Kans.

Application April 16, 1937, Serial No. 137,241

6 Claims. (Cl. 119—61)

The object of my invention is to provide a sanitary poultry feeder, one that is easily cleansed, having removable parts to facilitate such performance.

A further object of my invention is to provide a trough-like structure having a coil spring structure that will expand from one end of the trough to the other, and means to secure the spring therein.

A still further object of my invention is to provide an anchor to engage adjustably in each end of the trough, each of said anchors serving to secure one or more of the convolutions of the spring so as to separate the medially positioned convolutions thereof, between which poultry have access to food contained in the trough. And furthermore, the said anchors cause close engagement of the convolutions when secured thereby to avoid trapping the poultry therebetween.

A still further object of my invention is to provide a coil having a sector of each convolution on the corresponding side of the coil drawn outward to form an extended peak external thereon as means to prevent poultry perching thereon. These and other objects will hereinafter be more fully explained, reference being had to the accompanying drawing forming a part of this specification and in which like characters will apply to like parts of the different views.

Referring to the drawing, Fig. 1 is a plan view of the poultry feeder. Fig. 2 is a side view of Fig. 1. Fig. 3 is a cross sectional view taken on line 3—3 in Fig. 1, looking in the direction of the arrows.

My invention herein disclosed consists of a trough body 1, the ends of which are closed by a wall 1' respectively and each end of said trough is supported by a member, 2, trapezoidal in contour, the body walls of the trough are integrally joined and diverge upward as shown in Fig. 3, the marginal edges of which are turned inward obliquely toward each other to form a flange as shown at A, as means to engage with a coil spring 3 when positioned in the trough, the point of engagement being approximately at the diametrical center of the coil. The inturned portion A of each side has a plurality of apertures 4, spaced apart and extending a short distance from each end of the trough to engage the terminal ends of an anchor element 5, the said anchor having a medial bend B near the bottom of the trough in which it is positioned. From the bend each way a portion thereof is approximately straight and rests upon its respective side of the trough for a distance upward to point C, where another bend is made and from thence a portion slants outwardly from a vertical plane as at D, while the terminal end portion is arcuate as at E and has an abrupt bend for an end portion as at F to engage in the said apertures selectively.

The object of an anchor being formed as above described, is to engage the coil convolutions in such a manner as to cross the same to insure firm contact therewith, and being so arranged, the said coil structure may be expanded or contracted to vary the space between its convolutions, according to the age and size of the poultry for adequate room and access to food contained in the trough, and while I have shown at one end of the trough a plurality of convolutions closely engaging and retained by its respective anchor, the same may occur at the other end as in no instance shall the width or assemby of the said convolutions be excessive in number, occupying unnecessary space at either end of the trough, and the space between the apertures being slightly greater than the diameter of the wire forming the coil, is means for close engagement, as shown in Figs. 1 and 2, the purpose of which is to avoid trapping the toes or claws of poultry stepping thereon. Furthermore, to prevent poultry from perching upon the coil, I have formed a sector portion of each convolution with a pointed end as shown at G, extending upward.

While I have shown and described a coil spring of a comparatively large gauge, with respect to the wire in diameter, and the ends of the trough specifically formed, I do not wish to be restricted to such alone, as the same may be varied in size and form, and such other modifications may be employed as lie within the scope of the appended claims.

Having fully described my invention what I claim as new and desire to secure by Letters Patent is:—

1. In a poultry feeder of the class described comprising a trough having ends therefor, and inturned flanges on each of its other edges, the flanges having a plurality of apertures spaced apart for a short distance from each end thereof, an anchor element extending across from flange to flange, the anchor having a portion of each end turned downward to engage in the apertures of their respective flanges, and a coil spring positioned in the trough between said flanges, each end portion of the same being secured by the anchors, there being one anchor at each end of the trough.

2. In a poultry feeder of the class described comprising a trough having a plurality of flanges, the flanges being apertured a spaced distance from each end thereof, a coil spring comprising a plurality of convolutions, a sector portion of each convolution having a peak formed thereon and outwardly extending, the peak portions positioned upward from the trough, and an anchor for each end of the trough, the anchors having a portion of each end turned downward to engage in the apertures of the flanges selectively as securing means for a selected number of the coil spring convolutions securing the same adjacent their respective ends of the trough.

3. In a poultry feeder as an article of manufacture a trough comprising two side walls diverging upward and each wall at its outer extremity having a flange turned inward toward each other, the ends of the trough being closed and having an element attached thereto as a support for the trough, the opposite ends of each flange being apertured plurally for a spaced distance from the ends of the trough, a coil spring to engage in the trough, the diameter of which is approximately equal to the space between the inner edges of the flanges, each convolution of the spring having a sector portion formed with a peak extending outward, the portions being aligned, and an anchor shaped to conform approximately to the walls of the trough, each upper end of the anchor being arcuate in form so that their terminal ends will engage in the apertures selectively as securing means for one or more of the convolutions to either end closure of the trough walls.

4. In a poultry feeder as an article of manufacture, a trough having two diverging walls from the bottom upward and each wall at its upper edge having a flange portion turned inward toward the other flange portion and the end portions of each flange having apertures spaced apart for a short distance, each end of the trough having secured thereto an element trapezoidal in contour functioning as a support for the trough, a coil spring element to closely fit in the trough between the inner edges of the flanges and adapted to extend from end to end of the trough, said spring also adapted to expand with respect to the space between the coils thereof by close engagement of a selected number of the coils at either end of the trough, and means to anchor the selected coils in snug engagement, said means engaging with the apertures.

5. In a poultry feeder, a trough V-shaped in cross section, each end of the trough being closed and having a supporting element secured thereto, a flange for each upper edge of the sides of the trough, the said flanges being turned inward toward each other, and each end of each flange being apertured, a spiral coil comprising a plurality of convolutions, the coil being equal in length to that of the trough, the said coil being capable of expansion or contraction to vary the space between its convolutions, an outwardly extending peak formation for a sector of each convolution, and the sectors being aligned longitudinally of the coil, and upwardly positioned as carried in the trough, by which means perching of the poultry thereon is eliminated, and means coacting with the apertures to anchor a selected number of the convolutions close to either end closure of the trough.

6. In a poultry feeder, a trough and a spiral spring, the trough comprising two sides extending upward and outward from each other and the upper marginal portions of the sides turned upward and inward toward each other to form a flange and being apertured at each end of each flange, each end of the trough being closed by a wall and to which is secured an element, trapezoidal in contour, functioning as legs for the trough, and as an abutment against which the ends of the spring will engage, means integrally formed on a segmental portion of each convolution of the spring to avoid perching of the poultry thereon, the said segmental means being aligned longitudinally of the spring and upwardly positioned, and anchor means at each end of the trough to engage in their respective apertures in each flange as means to bend a pre-determined number of convolutions to snug engagement and against their respective end walls.

CLARENCE ELLIOTT HEDRICK.